United States Patent
Mayor

(10) Patent No.: US 9,832,617 B1
(45) Date of Patent: Nov. 28, 2017

(54) USING PERIODIC MAGNETOMETER SIGNALS FOR INDOOR NAVIGATION

(71) Applicant: Apple Inc., Cupertino, CA (US)

(72) Inventor: Robert Mayor, Half Moon Bay, CA (US)

(73) Assignee: Apple Inc., Cupertino, CA (US)

( * ) Notice: Subject to any disclaimer, the term of this patent is extended or adjusted under 35 U.S.C. 154(b) by 89 days.

(21) Appl. No.: 15/056,869

(22) Filed: Feb. 29, 2016

Related U.S. Application Data

(60) Provisional application No. 62/235,179, filed on Sep. 30, 2015.

(51) Int. Cl.
*H04W 24/00* (2009.01)
*H04W 4/04* (2009.01)
*H04W 4/02* (2009.01)

(52) U.S. Cl.
CPC .......... *H04W 4/043* (2013.01); *H04W 4/027* (2013.01)

(58) Field of Classification Search
CPC .............................. H04W 4/043; H04W 4/027
USPC .......................................................... 455/457
See application file for complete search history.

(56) References Cited

U.S. PATENT DOCUMENTS

| | | | |
|---|---|---|---|
| 8,660,581 B2 | 2/2014 | Davis et al. | |
| 8,751,151 B2 * | 6/2014 | Funk ...................... | H04W 4/04 340/539.13 |
| 2015/0018018 A1 * | 1/2015 | Shen ........................ | H04W 4/04 455/457 |
| 2015/0099539 A1 * | 4/2015 | Titus ...................... | H04W 64/00 455/456.1 |
| 2015/0141050 A1 * | 5/2015 | Haverinen .............. | H04W 4/04 455/456.1 |
| 2015/0168153 A1 * | 6/2015 | Hsu ........................ | G01C 21/20 701/469 |
| 2015/0212191 A1 | 7/2015 | Zhang et al. | |

OTHER PUBLICATIONS

Radu, "Indoor localization of mobile devices for wireless networks monitoring system based on Pedestrian Dead Reckoning," University of Edinburgh Thesis, 68 pages (2011).

Török and Helfenbein, "A Novel Framework for Personalized and Context-aware Indoor Navigation Systems," Mobility 2012, pp. 60-63 (2012).

* cited by examiner

*Primary Examiner* — Shahriar Behnamian

(74) *Attorney, Agent, or Firm* — Fish & Richardson P.C.

(57) ABSTRACT

Systems and techniques are described that can be used to determine a number of levels of a multilevel building crossed by a mobile device, that is carried by a user during an elevator trip, based on characteristics of a periodic magnetometer signal. The periodic magnetometer signal is formed, by a magnetometer of the mobile device, in response to the magnetometer traversing a portion of an iron-based periodic structure corresponding to the number of levels of the multilevel building during the elevator trip.

20 Claims, 12 Drawing Sheets

⦿ Candidate location at $t_2=t_1+\Delta t$ estimated based on $\{a(t), m(t)\}$ OR $\{a(t), b(t), m(t)\}$

USING PERIODIC MAGNETOMETER SIGNALS FOR INDOOR NAVIGATION

CROSS-REFERENCE TO RELATED APPLICATION

This application priority to U.S. Provisional Patent Application No. 62/235,179, filed Sep. 30, 2015, then entire contents of which are incorporated herein by reference.

FIELD OF TECHNOLOGY

The present disclosure is generally related to indoor navigation, and more specifically to using periodic magnetometer signals for indoor navigation.

BACKGROUND

A plurality of sensor signals, formed by sensors of a mobile device carried by a user of the mobile device, such as an accelerometer, a gyroscope, and a magnetometer are used for indoor navigation, e.g., to determine, based on the mobile device's motion linear speed, turning speed, and heading (e.g., direction relative to the magnetic North Pole of the Earth's Magnetic Field), respectively, a current location of the user carrying the mobile device, as the user walks on a given level of a multilevel building. Note that, here, the mobile device's current motion heading is determined from a magnetometer signal, formed by the magnetometer of the mobile device, indicative of magnitude, declination and inclination of Earth's Magnetic Field at an x-y location of the mobile device, e.g., at the current latitude and longitude. Additionally, barometer signals formed by a barometer of the mobile device can be used, in conjunction with other of the noted sensor signals to determine whether the user carrying the mobile device crosses the levels of the building, e.g., while riding in an elevator or climbing up or down a stairwell of the multilevel building.

SUMMARY

In this specification, technologies are described that can be used to determine whether a mobile device carried by a user crosses levels of a multilevel building during an elevator ride, based on characteristics of a periodic magnetometer signal formed by a magnetometer of the mobile device, where the periodic magnetometer signal correlates to an iron-based periodic structure corresponding to the levels of the multilevel building crossed by the mobile device.

One aspect of the disclosure can be implemented as a mobile device that includes a magnetometer; a storage device to store floor plans of respective levels of a multilevel building; and one or more hardware processors implementing an indoor location estimator system configured to estimate location of the mobile device while the mobile device is in motion on a first level of the multilevel building, the mobile device location on the first level being estimated based on the first level's floor plan; estimate that the mobile device enters an elevator of the multilevel building, on the first level, and exits the elevator after a time interval; determine, at least in part based on characteristics of a periodic magnetometer signal, that the mobile device has exited the elevator on a second level of the multilevel building that is offset from the first level by a number of levels. The periodic magnetometer signal is formed, by the magnetometer, in response to the magnetometer traversing a portion of an iron-based periodic structure corresponding to the number of levels of the multilevel building during the time interval. The indoor location estimator system is further configured to select, in response to determination of the second level, the second level's floor plan from among the stored floor plans; and estimate location of the mobile device while the mobile device is in motion on the second level of the multilevel building based on the selected floor plan.

Implementations can include one or more of the following features. In some implementations, the indoor location estimator system can count periods of the periodic magnetometer signal formed during the time interval, and can attribute the counted periods to the number of levels between the first level where the mobile device has entered the elevator and the second level where the mobile device has exited the elevator. In some cases when the mobile device includes a barometer, the second level where the mobile device has exited the elevator can be determined by the indoor location estimator system as the first level plus the number of levels, if a barometer signal indicates an increase in altitude over the time interval, or as the first level minus the number of levels, if a barometer signal indicates a decrease in altitude over the time interval.

In some implementations when the mobile device includes a barometer, to determine the second level where the mobile device has exited the elevator, the indoor location estimator system can estimate two or more potential levels based on (i) a barometer signal indicative of an altitude difference between the first level and the potential levels, and (ii) a known distance between adjacent levels. Additionally, the indoor location estimator system can use the characteristics of the periodic magnetometer signal to select the second level where the mobile device has exited the elevator from among the two or more potential levels.

In some implementations when the mobile device includes an accelerometer, the estimation by the indoor location estimator system whether the mobile device is inside the elevator during the time interval can be performed in response to receipt, by the indoor location estimator system, of (i) portions of an accelerometer signal indicative of a walking state, prior to and after the time interval, and (ii) another portion of the accelerator signal indicative of a stationary state, during the time interval.

In some implementations, the indoor location estimator system can estimate the location of the mobile device while the mobile device is in motion on either of the first level or the second level of the multilevel building as an output of a probabilistic particle filter. In some cases, the indoor location estimator system can interrupt estimation of location of the mobile device along directions orthogonal to a direction of an elevator trip for a duration of the periodic magnetometer signal, and can resume the estimation of the location along directions orthogonal to the direction of the elevator trip when the periodic magnetometer signal subsides.

Another aspect of the disclosure can be implemented as a method for estimating location of a mobile device in a multilevel building. The method includes estimating, by the mobile device, a location of the mobile device while the mobile device is in motion on a departure level of the multilevel building. The mobile device location on the departure level is estimated using the departure level's floor plan from among a plurality of floor plans of respective levels of the multilevel building. The method further comprises estimating, by the mobile device, that the mobile device enters an elevator of the multilevel building, on the departure level, and then exits the elevator after a time interval; determining, by the mobile device at least in part based on characteristics of a periodic magnetometer signal, that the mobile device has exited the elevator on an arrival level of the multilevel building that is offset from the departure level by a number of levels. The periodic magnetometer signal is formed, by a magnetometer of the mobile device, in response to the magnetometer traversing a portion of an iron-based periodic structure corresponding to the number of levels of the multilevel building during the time interval. Furthermore, the method includes selecting, in response to determination of the arrival level, the arrival level's floor plan from among the plurality of floor plans; and estimating location of the mobile device while the mobile device is in motion on the arrival level of the multilevel building based on the selected floor plan.

Implementations can include one or more of the following features. In some implementations, the method can include counting, by the mobile device, periods of the periodic magnetometer signal formed during the time interval; and attributing, by the mobile device, the counted periods to the number of levels between the departure level where the mobile device has entered the elevator and the arrival level where the mobile device has exited the elevator. In some cases, the method can further include (i) adding, by the mobile device, the number of levels to the departure level to obtain the arrival level, if a barometer signal indicates an increase in altitude over the time interval, wherein the barometer signal is formed by a barometer of the mobile device, and (ii) subtracting, by the mobile device, the number of levels from the departure level to obtain the arrival level, if the barometer signal indicates a decrease in altitude over the time interval.

In some implementations, the method can include estimating, by the mobile device, two or more potential levels based on (i) a barometer signal indicative of an altitude difference between the departure level and the potential levels, and (ii) a known distance between adjacent levels, wherein the barometer signal is formed by a barometer of the mobile device; and selecting, by the mobile device, the arrival level where the mobile device has exited the elevator from among the two or more potential levels based on the characteristics of the periodic magnetometer signal.

In some implementations, the estimating that the mobile device is inside the elevator during the time interval can include receiving, prior to and after the time interval, portions of an accelerometer signal indicative of a walking state, the accelerator signal being formed by an accelerometer of the mobile device, and during the time interval, another portion of the accelerator signal indicative of a stationary state.

In some implementations, the method can include estimating, by the mobile device, the location of the mobile device while the mobile device is in motion on either of the departure level or the arrival level of the multilevel building by operating a probabilistic particle filter. In some cases, the method can further include interrupting, by the mobile device, estimation of the location of the mobile device along directions orthogonal to a direction of an elevator trip for a duration of the periodic magnetometer signal; and resuming, by the mobile device, the estimation of the location along directions orthogonal to the direction of the elevator trip when the periodic magnetometer signal subsides.

Yet another aspect of the disclosure can be implemented as a non-transitory computer-readable medium encoding instructions that, when executed by processor of a mobile device, causes the mobile device to perform operations including estimating that the mobile device enters an elevator of a multilevel building, on a departure level, and then exits the elevator after a time interval; and determining, at least in part based on characteristics of a periodic magnetometer signal, that the mobile device has exited the elevator on an arrival level of the multilevel building that is offset from the departure level by a number of levels. The periodic magnetometer signal is formed, by a magnetometer of the mobile device, in response to the magnetometer traversing a portion of an iron-based periodic structure corresponding to the number of levels of the multilevel building during the time interval.

Implementations can include one or more of the following features. In some implementations, the operations can include counting periods of the periodic magnetometer signal formed during the time interval; and attributing the counted periods to the number of levels between the departure level where the mobile device has entered the elevator and the arrival level where the mobile device has exited the elevator. In some cases, the operations can include adding the number of levels to the departure level to obtain the arrival level, if a barometer signal indicates an increase in altitude over the time interval, wherein the barometer signal is formed by a barometer of the mobile device; and subtracting the number of levels from the departure level to obtain the arrival level, if the barometer signal indicates a decrease in altitude over the time interval.

In some implementations, the operations can include estimating two or more potential levels based on (i) a barometer signal indicative of an altitude difference between the departure level and the potential levels, and (ii) a known distance between adjacent levels, where the barometer signal is formed by a barometer of the mobile device; and selecting the arrival level where the mobile device has exited the elevator from among the two or more potential levels based on the characteristics of the periodic magnetometer signal.

In some implementations, the operation of estimating that the mobile device is inside the elevator during the time interval can include receiving, prior to and after the time interval, portions of an accelerometer signal indicative of a walking state, the accelerator signal being formed by an accelerometer of the mobile device, and during the time interval, another portion of the accelerator signal indicative of a stationary state.

In some implementations, the operations can include estimating, by executing a probabilistic particle filter, a location of the mobile device while the mobile device is in motion on either of the departure level of the multilevel building, prior to entering the elevator, or the arrival level of the multilevel building, after exiting the elevator; interrupting the operation of estimating the location of the mobile device along directions orthogonal to a direction of an elevator trip for a duration of the periodic magnetometer signal; and resuming the operation of estimating the location along directions orthogonal to the direction of the elevator trip when the periodic magnetometer signal subsides.

The disclosed technologies can result in one or more of the following potential advantages. Accuracy of the estimated arrival level obtained based, at least in part, on a periodic magnetometer signal formed by a magnetometer of a mobile device during an elevator trip can increase relative to the accuracy of the estimated arrival level obtained based solely on a barometer signal formed by a barometer of the mobile device during the same elevator trip. In this manner, in implementations when the arrival level is estimated based on the periodic magnetometer signal, an indoor location estimator system implemented on the mobile device can resume on-level indoor navigation (also referred to as x-y indoor navigation) at the end of the elevator trip based on a smaller number of level floor plans (e.g., based on a single level floor plan) than the number of level floor plans used for resuming the on-level indoor navigation in implementations when the arrival level is estimated, with less accuracy, based on the barometer signal.

Moreover, lifetime of a battery of the mobile device can be lengthened, in accordance with the disclosed technologies, by interrupting on-level indoor navigation while the magnetometer signal exhibits periodicity, during the duration of an elevator trip, and resuming the on-level indoor navigation only when the periodicity of the magnetometer signal subsides, e.g., at the end of the elevator trip.

Details of one or more implementations of the disclosed technologies are set forth in the accompanying drawings and the description below. Other features, aspects, descriptions and potential advantages will become apparent from the description, the drawings and the claims.

Certain illustrative aspects of the systems, apparatuses, and methods according to the disclosed technologies are described herein in connection with the following description and the accompanying figures. These aspects are, however, indicative of but a few of the various ways in which the principles of the disclosed technologies may be employed and the disclosed technologies are intended to include all such aspects and their equivalents. Other advantages and novel features of the disclosed technologies may become apparent from the following detailed description when considered in conjunction with the figures.

DETAILED DESCRIPTION

Figure 1:
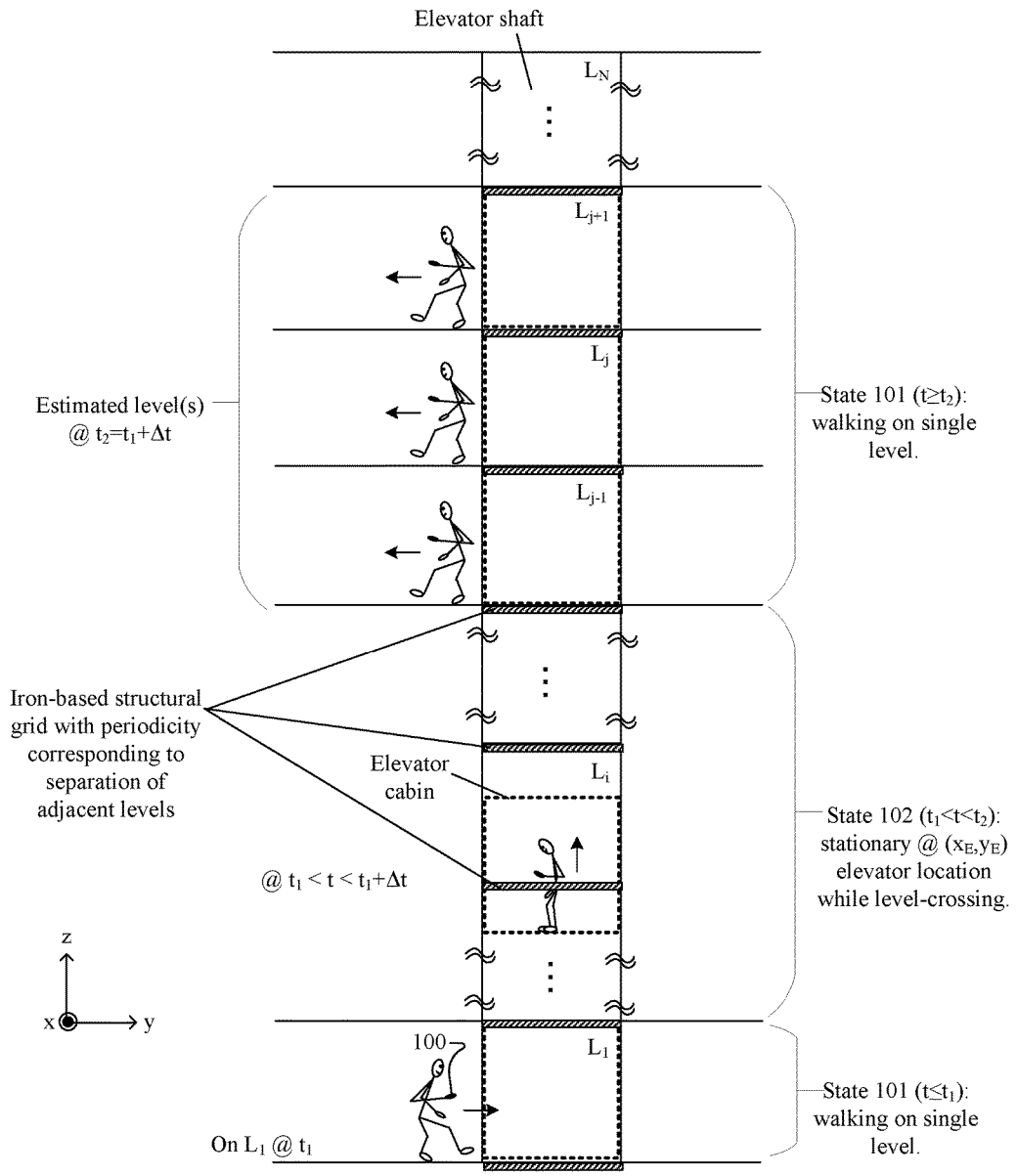
FIG. 1 shows a user of a mobile device that enters an elevator on a departure level of a multilevel building and exits the elevator after a time interval at an arrival level, different from the departure level. An indoor location estimator implemented on the mobile device estimates that the arrival level is one of a subset of levels of the multilevel building. The estimated level is obtained based, at least in part, on a periodic magnetometer signal formed by a magnetometer of the mobile device. In this example, the periodic magnetometer signal is formed due to the magnetometer traveling along an iron-based structural grid with periodicity corresponding to separation of adjacent levels.

FIG. 1 shows how an indoor location estimator system implemented on a mobile device 100 can be used for indoor navigation in a multilevel building. In this example, the mobile device 100 is carried by a pedestrian, also referred to as a mobile device user, or simply user, who enters an elevator on a departure level, here level $L_1$, at time $t_1$, and exits the elevator after a time interval $\Delta t$ at an arrival level, different from the departure level. The indoor location estimator system estimates that the arrival level is one of a subset $L_{j-1}$, $L_j$, $L_{j+1}$ of levels from among N levels $L_1, L_2, \ldots, L_N$ of the multilevel building, where N>2.

Note that, in this example, floors of respective levels are parallel to the (x-y) plane and an elevator shaft, which traverses all N levels of the multilevel building, is parallel to the z-axis. Moreover, a grid having a structural function encases the elevator shaft, and, thus, it is referred to as a structural grid. The structural grid includes grid components having constitutive materials based on iron, e.g., various types of steel-based rods, beams or girders. For instance, horizontal beams of the structural grid, shown schematically in FIG. 1, correspond to respective floors of the N levels of the multilevel building, and impart a periodicity to the structural grid, such that a period of the structural grid along the z-axis corresponds to a separation of adjacent levels. As the noted constitutive materials of the structural grid have magnetic properties (e.g., a finite/non-zero magnetic susceptibility), a magnetic signal formed by a magnetometer of the mobile device changes in a particular manner (e.g., increases/decreases by a given magnitude) when the mobile device moves near a component of the structural grid, and then it changes in an opposite manner (e.g., decreases/increases by the given magnitude) when the mobile device moves away from the noted component of the structural grid. As such, one or more arrival levels $L_{j-1}$, $L_j$, $L_{j+1}$ can be estimated by the indoor location estimator system implemented on the mobile device 100 based, at least in part, on a periodic magnetometer signal formed by the magnetometer that crosses two or more levels of the multilevel building during an elevator trip. In such cases, the periodic magnetometer signal is formed due to the magnetometer traveling along the iron-based structural grid with periodicity corresponding to separation of adjacent levels.

As described in detail below, the elevator trip of the mobile device 100 shown in FIG. 1 can be analyzed based on states of the mobile device classified in terms of activities performed by the mobile device user. For instance, for $t \leq t_1$, the mobile device is in a "walking" state 101, which means that the user carrying the mobile device is walking on the departure level $L_1$. The mobile device reaches the $(x_E, y_E)$ location of the elevator on the departure level $L_1$ at $t_1$, when the pedestrian enters the elevator cabin. For $t_1 < t < t_2$, the mobile device is in a "stationary at $(x_E, y_E)$ elevator location while level-crossing" state 102, which means that the user carrying the mobile device stands in the elevator cabin, while the elevator cabin crosses two or more levels of the multilevel building, as it ascends/descends through the elevator shaft. At $t_2$, upon reaching the arrival level, estimated to be $L_{j-1}$, $L_j$ or $L_{j+1}$, the mobile device transitions back into the walking state 101, and it remains in this state, for $t \geq t_2$, while the user carrying the mobile device is walking, away from the elevator, on the arrival level. Various techniques performed by the mobile device 100 to estimate its location before, during and after the foregoing elevator trip are described below in connection with FIGS. 5A-5C and 6A-6B.

Figure 2:
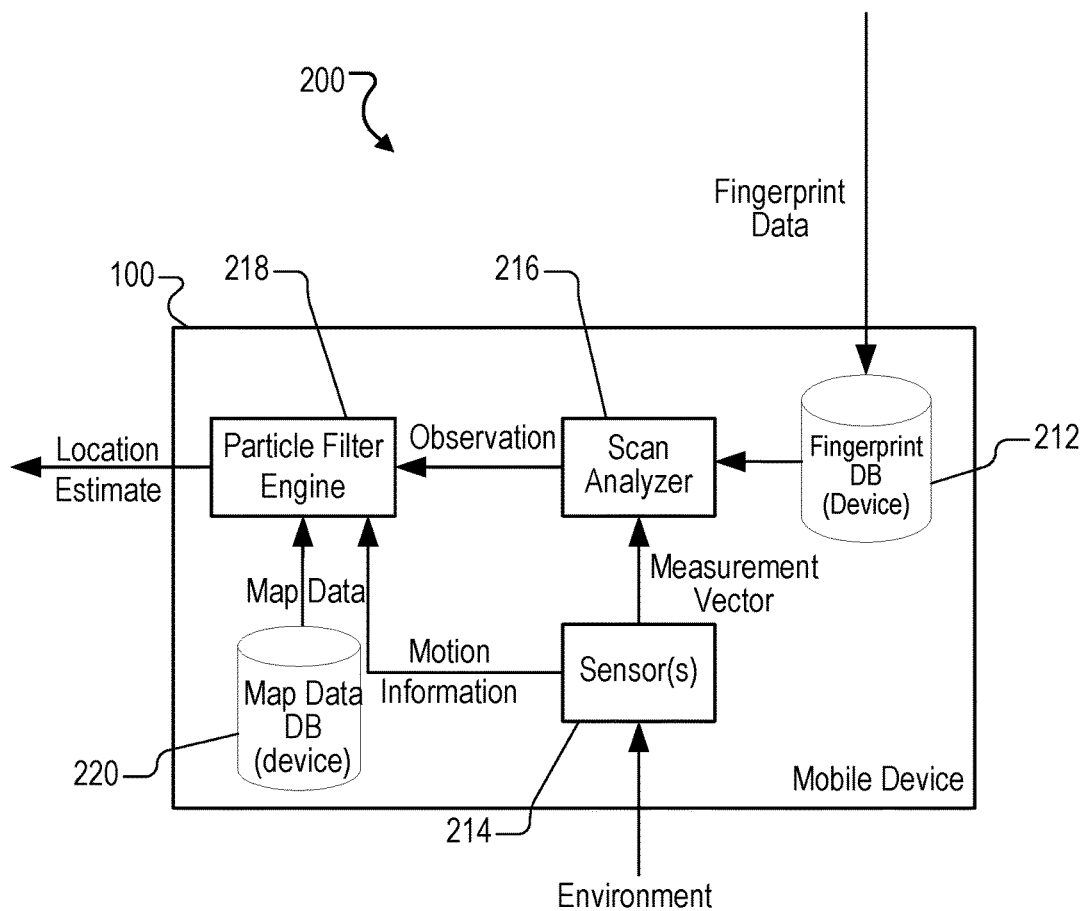
FIGS. 2 and 3 show aspects of an example of a location estimation system that uses a particle filter—having inputs that include (1) sensor signals formed on sensors of the mobile device, and (2) one or more level floor plans stored by the mobile device—to estimate location of the mobile device while moving on and/or crossing corresponding levels of the multilevel building.
Figure 3:
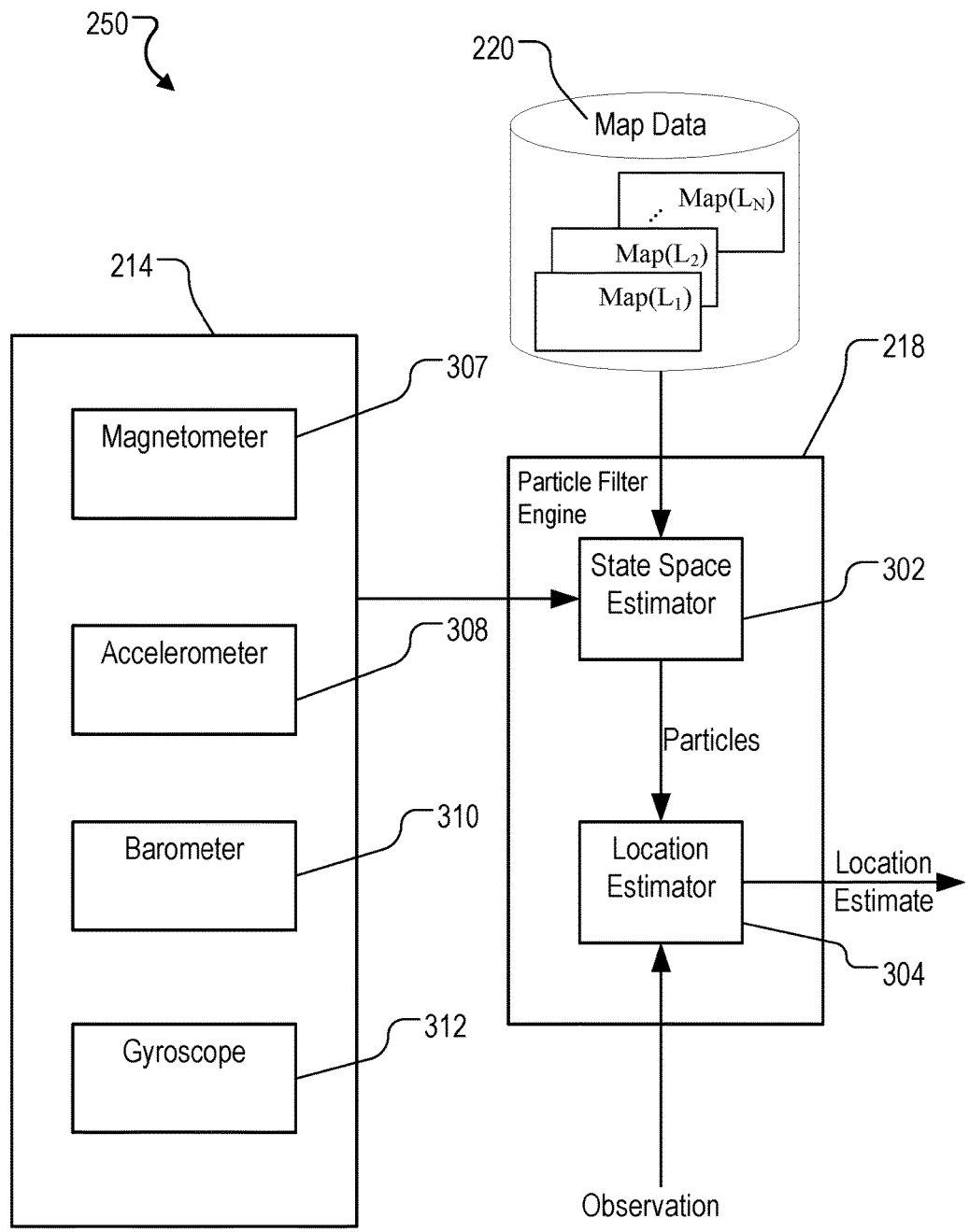

Systems implemented on a mobile device 100 to perform such location estimations before, during and after its elevator trip are described first. For instance, FIG. 2 shows a block diagram of an indoor location estimator system 200 implemented on a mobile device 100, and FIG. 3 shows a block diagram of a portion 250 of the indoor location estimator system. The mobile device 100 can be a smart phone, a smart watch or a combination thereof, for instance. In this example, the indoor location estimator system 200 includes one or more storage devices 212, 220 to locally store information to be used for indoor location estimations. For instance, a fingerprint database stored on the storage device 212 can store location fingerprint data received, e.g., from a location server in communication with the mobile device. Here, location fingerprint data includes observations of environment variables, such as WiFi and cell phone signal strengths, at various locations in the multilevel building. Further, a map data database stored on the storage device 220 can store floor plans of the N levels of the multilevel building, for instance. Furthermore, the indoor location estimator system 200 includes sensors 214, e.g., at least two or more of a magnetometer 307, an accelerometer 308, a barometer 310 and a gyroscope 312. Moreover, one or more hardware processors of the mobile device 100 execute a scan analyzer 215 and a particle filter engine 218. The scan analyzer 216 is configured to (1) receive a measurement vector formed based on values of sensor signals from respective sensors 214, and fingerprint data stored on the local storage device 212, and (2) designate a highest probable location of the mobile device as a location observation.

The particle filter engine 218 uses the location observation received from the scan analyzer 216, motion information received from the sensors 214, and map data accessed in the storage device 220 to determine a current location estimate. Moreover, the particle filter engine 218 includes a state space estimator module 302 and a location estimator module 304. The state space estimator module 302 receives map data in the form of floor plans $Map(L_1)$, $Map(L_2)$, $Map(L_N)$ of respective levels $L_1, L_2, \ldots, L_N$ of the multilevel building. Each of the floor plans $Map(L_j)$, where $j=1 \ldots N$, can include attributes of one or more constraints on level $L_j$ that includes a space accessible by a pedestrian carrying mobile device 100. The constraints can include structural constraints (e.g., walls). For instance, the state space estimator module 302 can determine that the pedestrian cannot transition through the structural constraint.

The state space estimator module 302 also receives motion information/context from the sensors 214. For example, an accelerometer signal received from the accelerometer 308 indicates to the state space estimator module 302 whether a movement of the pedestrian carrying the mobile device 100 is walking or running, a pace of the movement, and a stride of the movement. As another example, a gyroscope signal received from the gyroscope 312 indicates to the state space estimator module 302 whether the pedestrian carrying the mobile device 100 is turning. As yet another example, a magnetometer signal received from the magnetometer 307 can indicate to the state space estimator module 302 a pedestrian's heading parallel to the x-y plane. As yet another example, the state space estimator module 302 can determine that the mobile device user is traveling in the elevator, as shown in FIG. 1, when (1) a barometer signal from the barometer 310 indicates a change in air pressure due to altitude change and/or (2) a periodical magnetometer signal from the magnetometer 307 indicates level-crossing.

Based at least on the map constraints and the motion context, the state space estimator module 302 can determine candidate locations of the mobile device 100. The state space estimator module 302 can designate the candidate locations as samples (or "particles") for propagation in a particle filter $P((X,Y,Z)(t_k)|(X,Y,Z)(t_{k-1}))$, where $(X,Y,Z)(t_k)$ are current locations of the mobile device 100 at time $t_k$, and $(X,Y,Z)(t_{k-1})$ are previous locations at time $t_{k-1}$. Propagating the particle filter can include applying the available information, including map data and motion context to the particle filter to determine a probability density of the candidate locations in at least a portion of the multilevel building, given previous locations. Upon propagating the particle filter, the state space estimator module 302 can provide the particle filter to the location estimator module 304 for update. The location estimator module 304 can update the particle filter using a location observation received from the scan analyzer 216. The location observation can be subject to a measurement model having a given system uncertainty. Updating the particle filter can include calculating a probability density $P((X,Y,Z)(t_k)|(X,Y,Z)(t_{k-1}), M(t_k))$, where $M(t_k)$ is a location observation at time $t_k$. In this step, the candidate locations (i.e., the particles) are updated according to the new location observation. The location estimator module 304 can then determine a current location of mobile device 100 (location at time $t_k$) using the probability density, including designating a most likely location of mobile device as the current location of mobile device.

Figure 4:
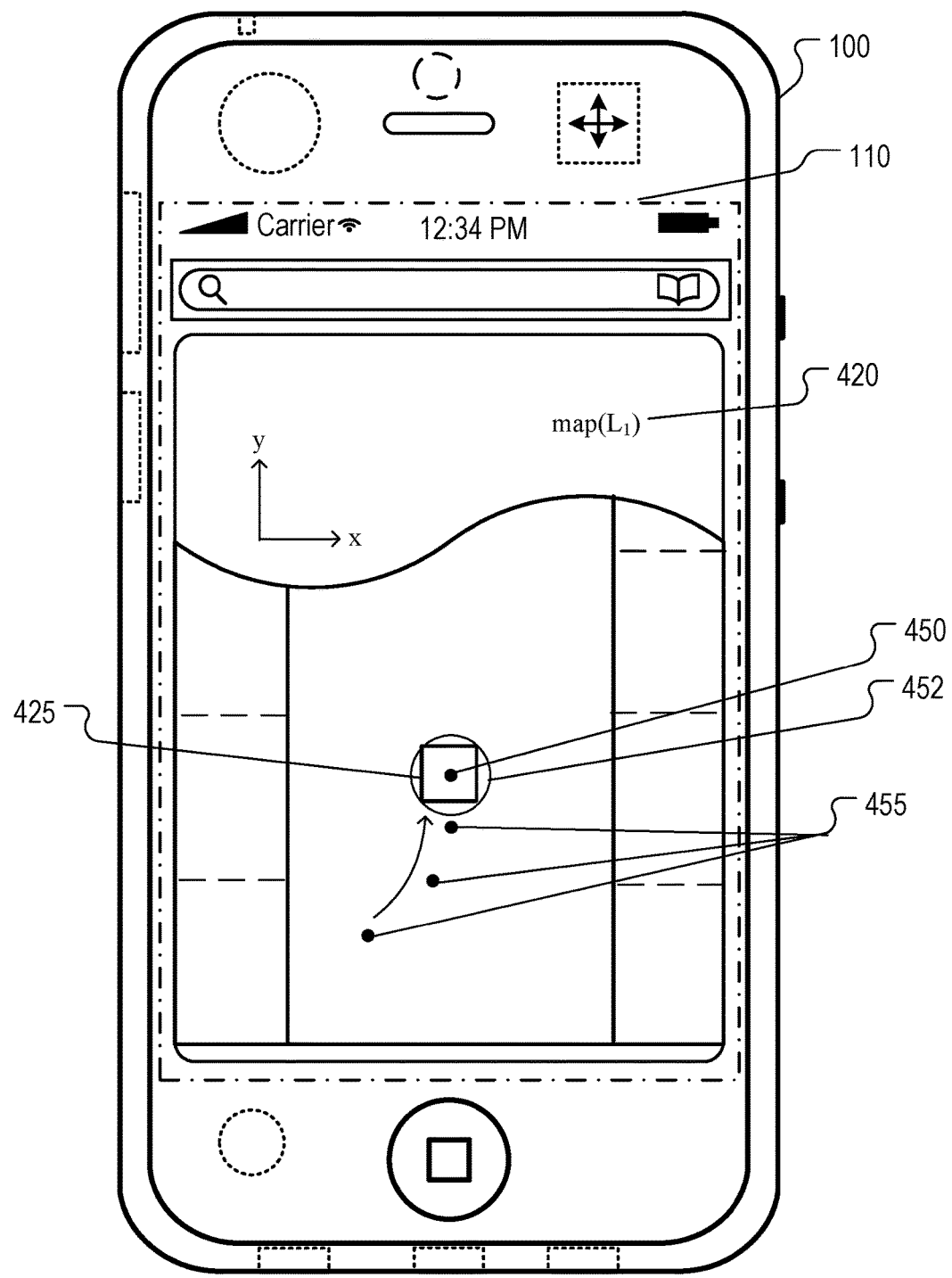
FIG. 4 shows a graphical user interface (GUI) that includes a map of a departure level indicating a path traveled by a mobile device to an estimated location of the mobile device inside an elevator.

The determined location estimate can be provided for display, by the particle filter engine 218, to a display device associated with the mobile device 100, as shown in FIG. 4. Here, a floor plan 420 $map(L_1)$ of the departure level $L_1$—on which the pedestrian carrying the mobile device 100 is walking for $t \leq t_1$—is presented on a display device 420 of the mobile device. A map representation of a location 425 of the elevator is shown on the floor plan 420 $map(L_1)$ of the departure floor $L_1$. Additionally, a location of the mobile device 100 at $t=t_1$ is shown on the floor plan 420 $map(L_1)$ as a current location marker 450. Note that an uncertainty area 452 overlapping the current location marker 450 is indicative of an (x-y) uncertainty of estimating the location of the mobile device by the indoor location estimator system 200. Additional markers 455 can be shown on the floor plan 420 $map(L_1)$ as previous locations of the mobile device 100, e.g., at times $t_{k-2}<t_{k-1}<t_k<t_1$, to indicate a path taken by the pedestrian walking towards the elevator, for $t<t_1$. Note that, in the example shown in FIG. 4, the indoor location estimator system 200 has determined that, at $t=t_1$, the mobile device 100 is inside the elevator. Other structural and functional aspects relating to the indoor location estimator system 200 and its components are illustrated in FIGS. 4-15 of U.S. Pat. No. 8,996,302, entitled "Reduction of the impact of hard limit constraints in state space models" and issued on Mar. 31, 2015. The entire contents of the U.S. Pat. No. 8,996,302 is incorporated herein by reference.

Figure 5A:
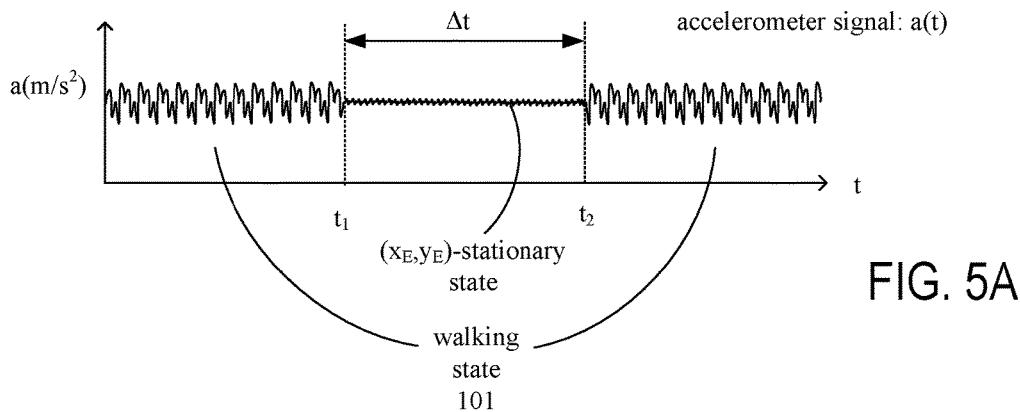
FIGS. 5A-5B show examples of an accelerometer signal formed by an accelerometer of the mobile device and a barometer signal formed by a barometer of the mobile device, each of the signals formed before, during and after the elevator trip.

FIG. 5A shows an example of an accelerometer signal a(t) formed by the accelerometer 308 of the mobile device 100 before the elevator trip, for $t \le t_1$, during the elevator trip, for $t_1 < t < t_2$ and after the elevator trip, for $t \ge t_2$. Note that the accelerometer signal a(t) has particular frequency components indicative of a pace/stride of the pedestrian's walking towards the elevator, for $t \le t_1$ and away from the elevator, for $t \ge t_2$. Hence, in accordance with an activity-based classification of a state of the mobile device 100, the mobile device is in a walking state (denoted state 101 in FIG. 1) when $t \le t_1$ and $t \ge t_2$. Additionally, the accelerometer signal a(t) is quiescent (i.e., has only small amplitude, high frequency components) during the elevator trip, indicative of the pedestrian's standing inside the elevator cabin. Hence, the mobile device 100 is in a "stationary at $(x_E, y_E)$ elevator location" state that is different from the walking state 101, for $t_1 < t < t_2$.

Figure 5B:
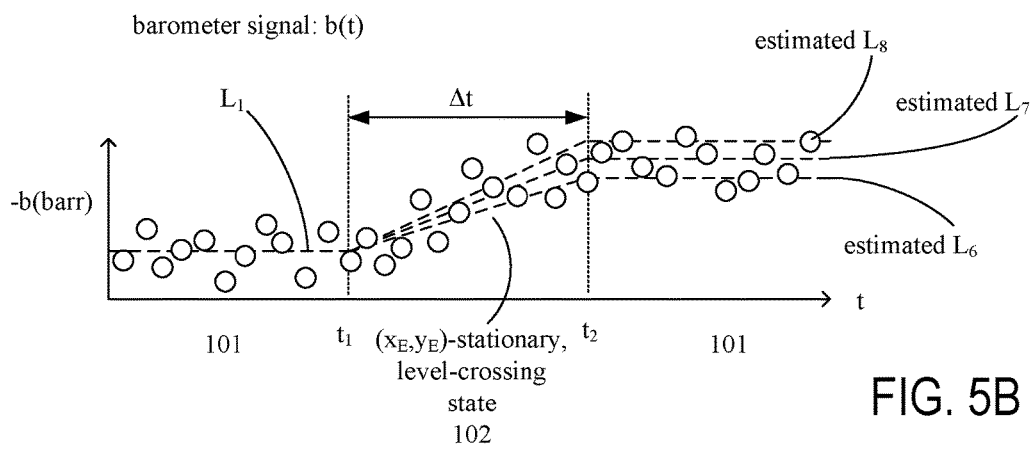

FIG. 5B shows an example of a barometer signal b(t) formed by the barometer 310 of the mobile device 100, concurrently with the accelerometer signal a(t), before the elevator trip, for $t \le t_1$, during the elevator trip, for $t_1 < t < t_2$ and after the elevator trip, for $t \ge t_2$. Note that, for $t \le t_1$ and $t \ge t_2$, the barometer signal b(t) is "flat" and, hence, is indicative, in conjunction with the accelerometer signal a(t), of the pedestrian's walking without crossing (multiple) levels of the multilevel building. In this manner, the barometer signal b(t) is compatible with the mobile device 100 being in the walking state 100 when $t \le t_1$ and $t \ge t_2$. In the example shown in FIG. 5B, the barometer signal b(t) uniformly decreases during the elevator trip, indicative of the elevator cabin carrying the pedestrian ascending through multiple levels of the multilevel building to elevations of lower air pressure. In other cases, the fact that the barometer signal b(t) uniformly increases during the elevator trip, indicates that the elevator cabin carrying the pedestrian is descending through multiple levels of the multilevel building to elevations of higher air pressure. Hence, based on both the barometer signal b(t) and accelerometer signal a(t), the mobile device 100 is in a "stationary at $(x_E, y_E)$ elevator location while level-crossing" state (denoted state 102 in FIG. 1) that is different from the walking state 101, for $t_1 < t < t_2$.

Further note that, in the example illustrated in FIG. 5B, a resolution of the barometer signal b(t) allows for discriminating height difference that are larger than 10 m, which corresponds to a distance between three levels. In other words, the arrival level for the elevator trip shown in FIG. 1, or the level on which the pedestrian departs the elevator to resume walking, can be determined to be either one of levels $L_{j-1}$, $L_j$, or $L_{j+1}$ (e.g., $L_6$, $L_7$, or $L_8$), with similar likelihood, because of the above-noted resolution of the barometer signal b(t) shown in FIG. 5B.

Figure 5C:
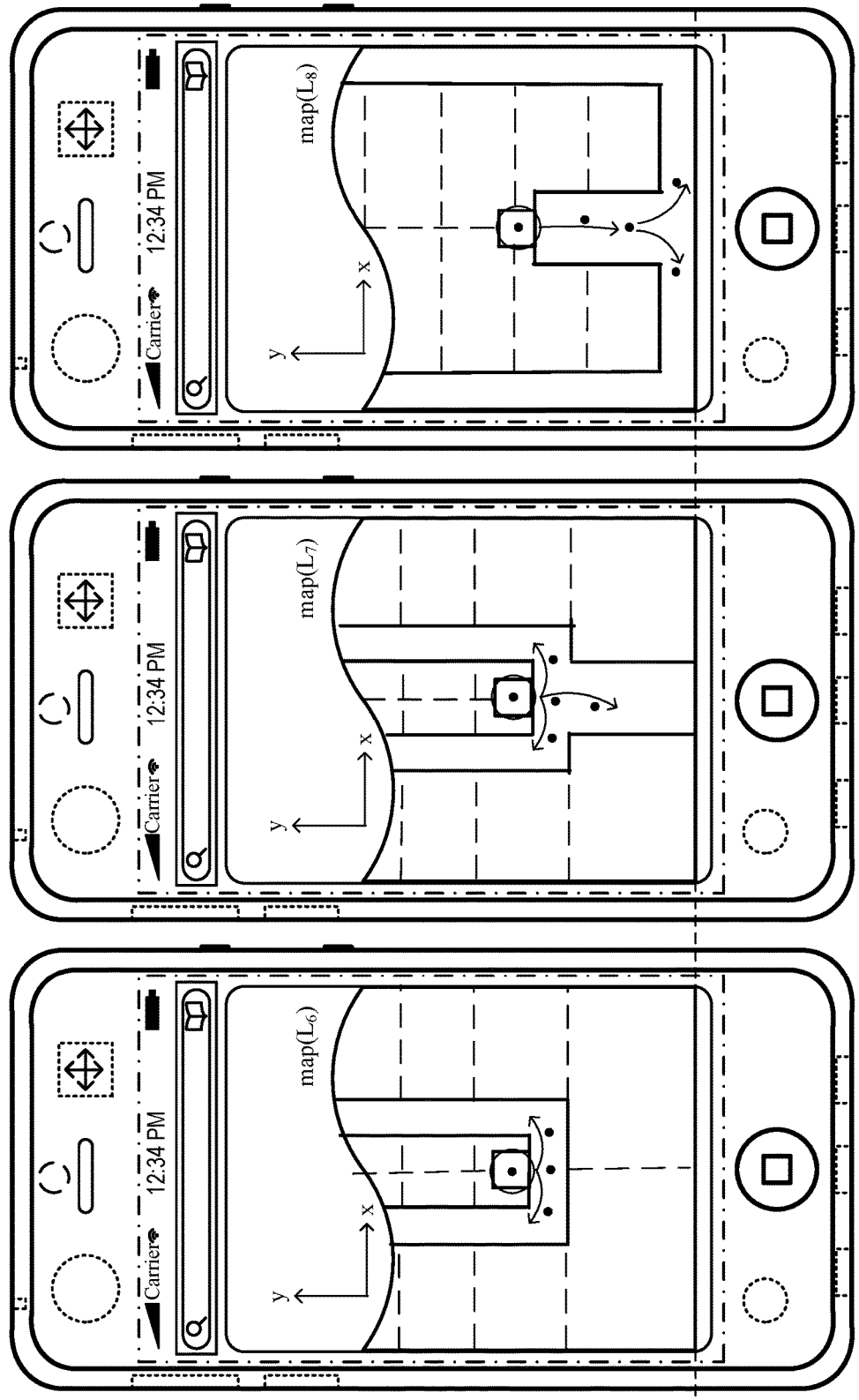
FIG. 5C shows instances of a GUI that include respective maps of estimated arrival levels, each of the maps indicating the estimated location of the mobile device inside the elevator and candidate paths onto which the mobile device could travel once the user of the mobile device walks out of the elevator.

In this manner, when the particle filter engine 218 receives estimates of the location of the mobile device 100 at the end of the elevator trip, at $t=t_2$, in accordance with the barometer signal b(t) shown in FIG. 5B, the particle filter engine determines a current location of the mobile device to be at the $(x_E, y_E)$ elevator location on either one of levels $L_6$, $L_7$ or $L_8$. In some implementations, the indoor location estimator system 200 can (i) present on the display of the mobile device 100, either concurrently or sequentially (as shown in FIG. 5C), respective floor plans map($L_6$), map($L_7$), and map($L_8$) of the estimated arrival level $L_6$, $L_7$, and $L_8$, and (ii) prompt the user to select the appropriate arrival floor based on whichever of the presented floor plans best resembles the actual arrival floor where the user has stepped out of the elevator (e.g., level $L_7$.) In order to aid the user in selecting the appropriate one of the presented floor plans, the indoor location estimator system 200 can show, on each presented floor plan map($L_6$), map($L_7$), and map($L_8$), a current estimated location of the mobile device 100 at the $(x_E, y_E)$ elevator location, at $t=t_2$, and subsequent candidate locations of the mobile device, e.g., at times $t_2 < t_k < t_{k+1} < t_{k+2}$, to indicate a potential path to be taken by the user when walking away from the elevator, for $t \ge t_2$. Once the user selection is made, the indoor location estimator system 200 can resume indoor navigation, in the (x,y) plane of the actual arrival level, e.g., $L_7$, based on the user selected floor plan, e.g., map($L_7$).

In some implementations, the indoor location estimator system 200 can resume the indoor navigation, in the (x,y) plane of each of the arrival levels $L_6$, $L_7$, and $L_8$, estimated in accordance with the barometer signal b(t) shown in FIG. 5B, based on its respective floor plan map($L_6$), map($L_7$), and map($L_8$). As part of this "redundant navigation approach", the indoor location estimator system 200 lets the state space estimator module 302 of the particle filter engine 218 eliminate two of the floor plans map($L_6$), map($L_7$), and map($L_8$) that prove to be unfeasible after a predetermined number of particle propagations, e.g., floor plans map($L_6$) and map($L_8$). In this manner, the remaining feasible floor plan, e.g., floor plan map($L_7$) corresponds to the actual arrival level, e.g., $L_7$, and navigation, in the (x,y) plane of only the actual arrival level, is conducted by the indoor location estimator system 200 after the predetermined number of particle propagations. Note that the latter implementations, which do not require user input, consume more of the computing resources of the mobile device 100, because redundant navigation along multiple estimated arrival levels $L_6$, $L_7$, and $L_8$ is conducted at least for a predetermined number of particle propagations. As described below, use of a periodic magnetic signal makes estimation of the arrival level more accurate, and, hence, can lead to conserving the computing resources of the mobile device 100.

Figure 6A:
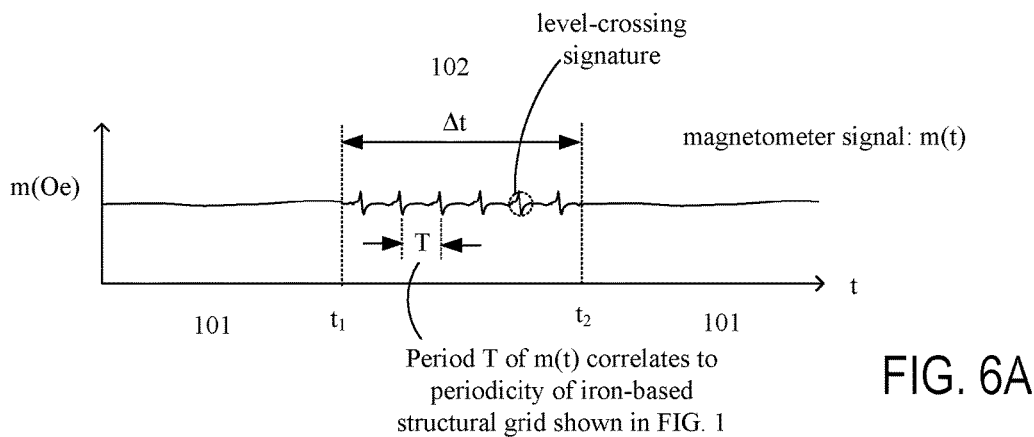
FIG. 6A shows an example of a magnetometer signal formed by a magnetometer of the mobile device before, during and after the elevator trip.

FIG. 6A shows an example of a magnetometer signal m(t) formed by a magnetometer 307 of the mobile device 100, concurrently with the accelerometer signal a(t) and the barometer signal b(t), before the elevator trip, for $t \le t_1$, during the elevator trip, for $t_1 < t < t_2$ and after the elevator trip, for $t \ge t_2$. Note that, for $t \le t_1$ and $t \ge t_2$, the magnetometer signal m(t) is quiescent, or non-periodic, and, hence, it is indicative, in conjunction with the accelerometer signal a(t), of the pedestrian's walking without crossing levels of the multilevel building. In this manner, the magnetometer signal m(t) is compatible with the mobile device 100 being in the walking state 100 when $t \le t_1$ and $t \ge t_2$. Further, the magnetometer signal m(t) is periodic during the elevator trip, indicative of the elevator cabin carrying the pedestrian crossing multiple levels of the multilevel building, either ascending or descending. Here, the magnetometer 307 of the mobile device 100 forms a periodic magnetometer signal m(t), for $t_1 < t < t_2$, in response to the magnetometer traversing, during this time interval, a portion of an iron-based periodic structure (e.g., the periodic structural grid shown in FIG. 1) corresponding to a plurality of levels of the multilevel building. Moreover, because the barometer signal b(t) can be used to determine a direction of the level-crossing indicated by the periodic magnetic signal m(t), a combination of the periodic magnetometer signal m(t) shown in FIG. 6A and the barometer signal b(t) shown in FIG. 5B is indicative of the elevator cabin carrying the pedestrian ascending through multiple levels of the multilevel building. Hence, based on the magnetometer signal m(t) and the accelerometer signal a(t), and optionally on the barometer signal b(t), the mobile device 100 is in a "stationary at $(x_E,y_E)$ elevator location while level-crossing" state 102, that is different from the walking state 101, for $t_1<t<t_2$.

Note that the scan analyzer 216, for instance, can use pattern recognition to identify "level-crossing" signatures (or pulses) in either (i) the magnetometer signal m(t) in time domain or (ii) the spectrum m(f) of the magnetometer signal, whether by using unsupervised learning, or supervised learning, e.g., the latter based on fingerprint data stored in the storage device 212. As such, the magnetometer signal m(t) is a series (or train) of level-crossing signatures with a period T, and, hence, the magnetometer signal m(t) is periodic, for $t_1<t<t_2$. The period T of the periodic magnetometer signal m(t) relates to the periodicity of the structural grid shown in FIG. 1, e.g., the period T of the periodic magnetometer signal m(t) corresponds to a separation of adjacent levels of the multilevel building. In this manner, the scan analyzer 216 can (I) count all periods T of the periodic magnetometer signal m(t) formed for $t_1<t<t_2$, and (II) attribute the counted periods to a difference ΔL between a departure level (e.g., $L_1$ in FIG. 1) where the mobile device 100 has entered the elevator (at $t=t_1$) and an arrival level (e.g., $L_j$ in FIG. 1) where it has exited the elevator (at $t=t_2$). In general, the scan analyzer 216 uses the complementary barometer signal b(t) to determine the arrival level as the departure level plus (minus) the difference ΔL, if the barometer signal b(t) indicates an increase (decrease) in altitude over the time interval $t_1<t<t_2$.

Figure 6B:
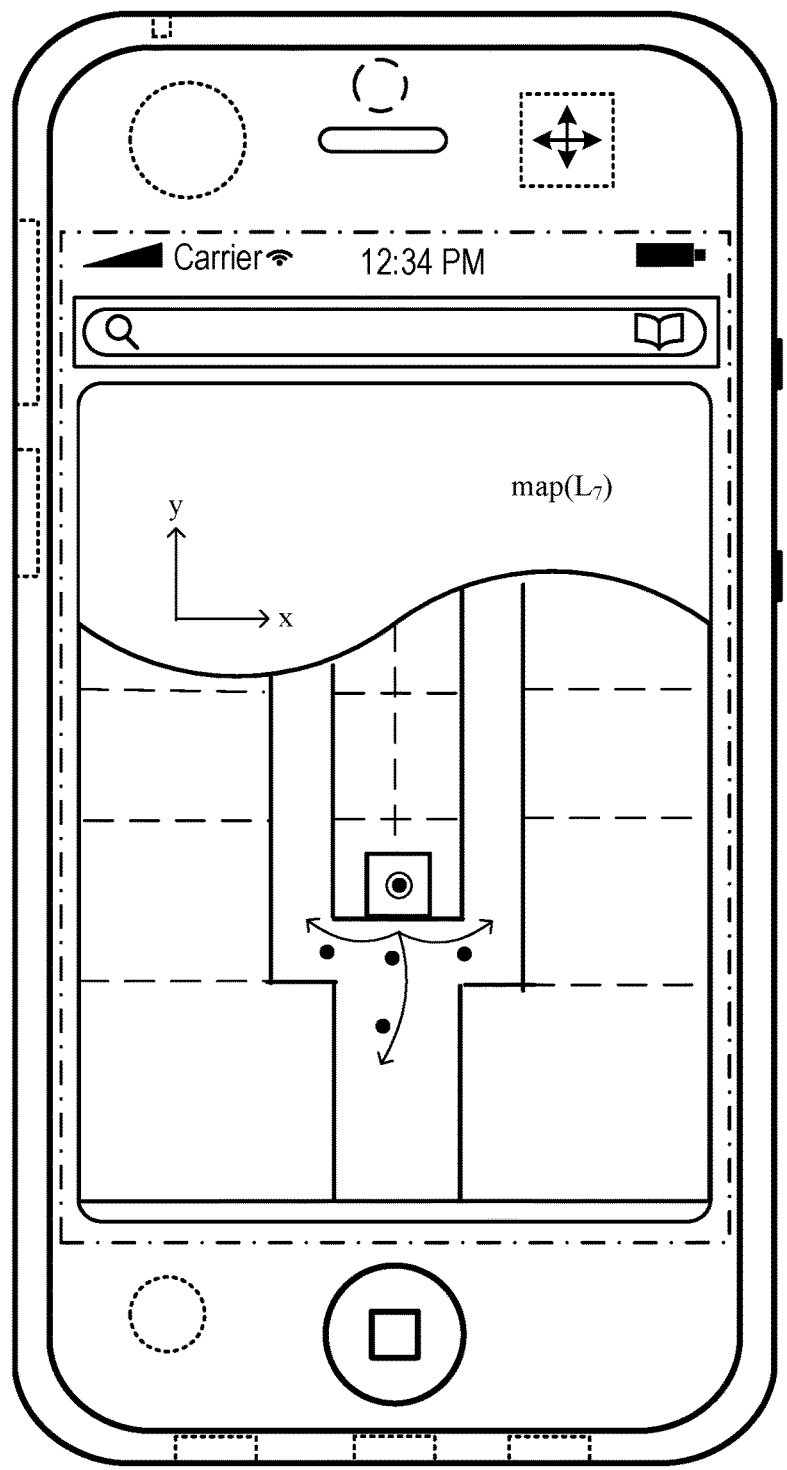
FIG. 6B shows a GUI that includes a map of an estimated arrival level, the map indicating the estimated location of the mobile device inside the elevator and candidate paths onto which the mobile device could travel once the user of the mobile device walk out of the elevator.

In some implementations, in which a set of two or more estimated arrival levels $L_{j-1}, L_{j+1}$ have been estimated by the indoor location estimator system 200 based on the accelerometer signal a(t) and the barometer signal b(t), as described above in connection with FIGS. 5A-5C, the actual arrival level can be determined by the indoor location estimator system from among the estimated arrival levels $L_{j-1}, L_j, L_{j+1}$ based on an analysis of the periodic magnetometer signal m(t), for $t_1<t<t_2$. For the example of barometer signal b(t) illustrated in FIG. 5B, the estimated arrival levels are $L_6$, $L_7$ and $L_8$. For the corresponding magnetometer signal m(t) illustrated in FIG. 6A, which was acquired over the same time as the barometer signal b(t), there are six periods T over the periodic portion of the magnetometer signal m(t) for $t_1<t<t_2$, and hence there have been six level-crossings during the elevator trip from the departure level $L_1$ to the arrival level. Hence, the indoor location estimator system 200 selects level $L_7$ as the actual arrival level from among the estimated arrival levels $L_6$, $L_7$ and $L_8$. The determined current location of the mobile device 100 at the $(x_E,y_E)$ location of the elevator on level $L_7$ can be provided for display by the by the particle filter engine 218, to a display device associated with the mobile device 100, as shown in FIG. 6B. Here, the indoor location estimator system 200 can show, on the floor plan map($L_7$) of the arrival level $L_7$, a current estimated location of the mobile device 100 at the $(x_E,y_E)$ location of the elevator, at $t=t_2$, and, optionally, subsequent candidate locations of the mobile device, e.g., at times $t_2<t_k<t_{k+1}<t_{k+2}$, to indicate a potential path to be taken by the user walking away from the elevator, for $t≥t_2$. In addition, once the arrival level selection is made by the indoor location estimator system 200, the indoor location estimator system can resume indoor navigation, in the selected arrival level $L_7$, based on its floor plan map($L_7$).

Figure 7:
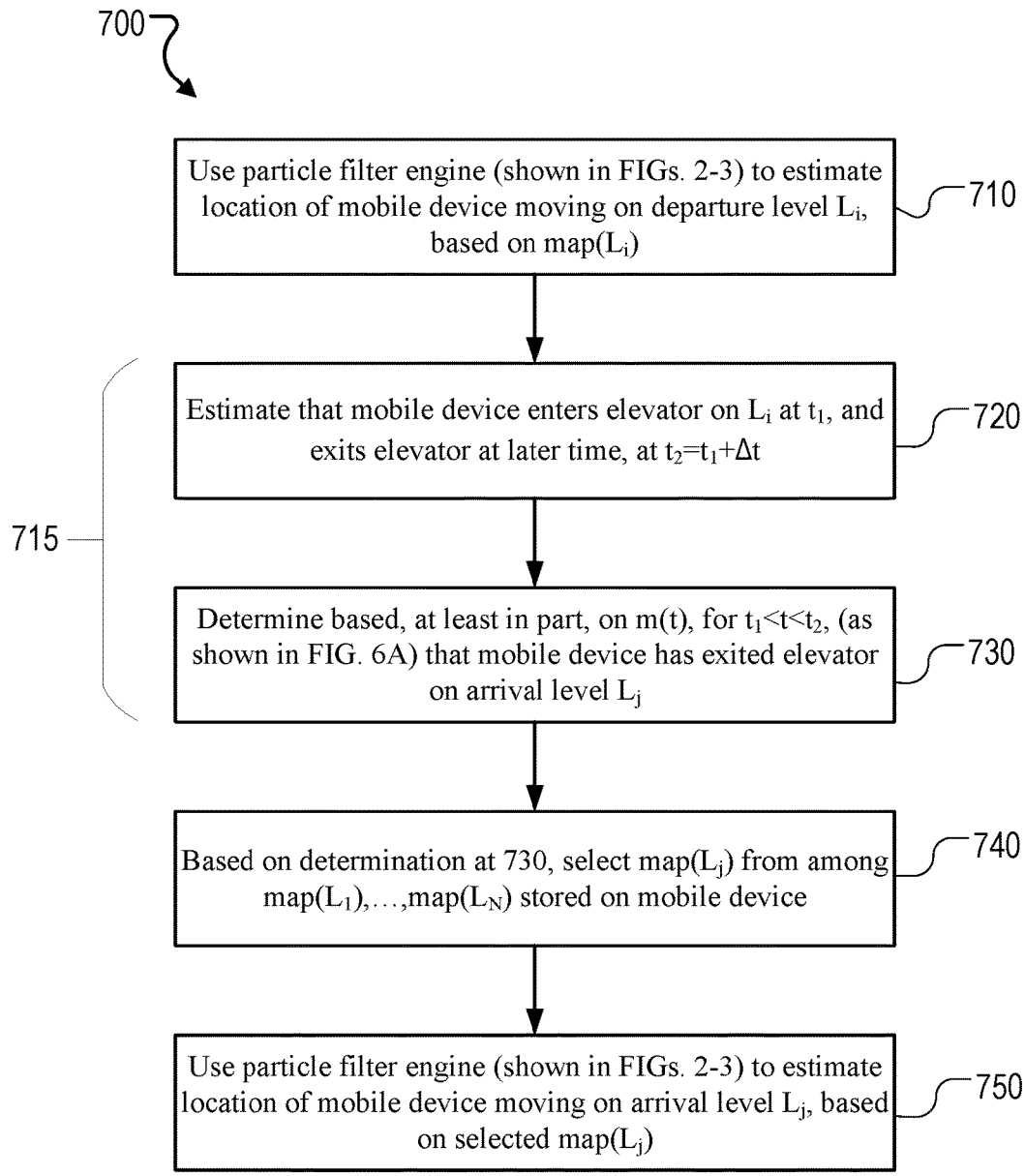
FIG. 7 shows an example of a technique for estimating, based on a magnetometer signal formed during an elevator trip, a floor on which the elevator trip of mobile device ends.

FIG. 7 shows an example of a technique 700, in accordance with the technologies described above in this specification, for estimating, based on a periodic magnetometer signal formed by a magnetometer of the mobile device during an elevator trip, a floor on which the elevator trip of the mobile device ends. The technique 700 can be implemented on the mobile device 100, e.g., it can be performed by an indoor location estimator system 200. Note that in a Cartesian coordinate system (x, y, z), an elevator shaft extents parallel to the z-axis and traverses all N levels of a multilevel building. As such, an $(x_E,y_E)$ location of the elevator is the same on each of the N levels. A plurality of floor plans map($L_1$), . . . , map($L_N$) is stored at the mobile device, each of the floor plans corresponding to an associated level of the multilevel building.

At 710, a location $(x,y,L_i)$ of a mobile device moving on a departure level $L_i$ of the multilevel building is estimated based on a floor plan map($L_i$) of the departure level $L_i$.

At 720, it is estimated that the mobile device (1) enters the elevator, i.e., the mobile device is located at $(x_E, y_E, L_i)$, at $t=t_1$, and then (2) exits the elevator at a later time, $t_2=t_1+Δt$.

At 730, it is determined, based at least in part on a periodic magnetometer signal formed by a magnetometer of the mobile device during the elevator trip, that the mobile device has exited the elevator on an arrival level $L_j$, i.e., the location of the mobile device at the end of the elevator trip, at $t=t_2$, is $(x_E, y_E, L_j)$. An example of a periodic magnetometer signal is described above in connection with FIG. 6A. A process 715 that includes a combination of steps 720 and 730 is described below in more detail in connection with FIG. 8.

At 740, a floor plan map($L_j$) corresponding to the determined arrival level $L_j$ is selected from among the plurality of locally stored floor plans map($L_1$), . . . m map($L_N$).

At 750, a location (x, y, $L_j$) of a mobile device moving on a departure level $L_j$ is estimated based on the selected floor plan map($L_j$).

Figure 8:
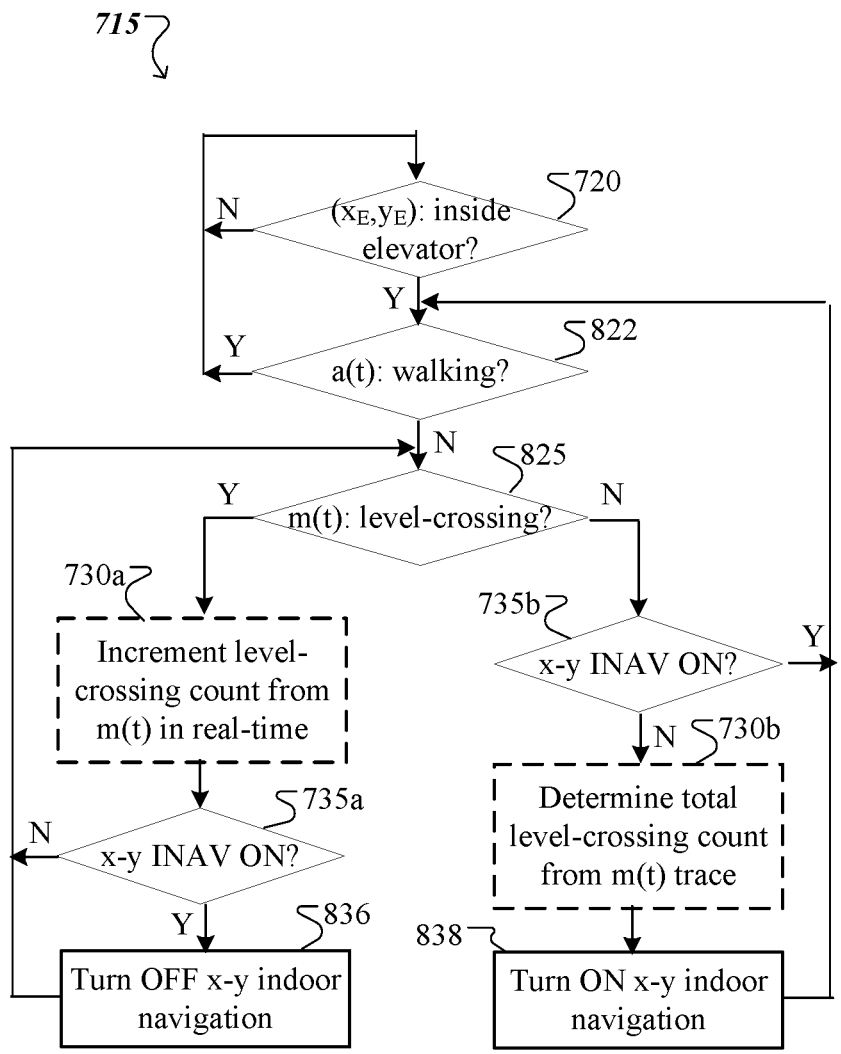
FIG. 8 shows an example of a technique for determining a count of levels crossed by a mobile device during an elevator trip of the mobile device.

FIG. 8 shows an example of a process 715 for determining a count of levels crossed by a mobile device during an elevator trip of the mobile device, the determining of the level-crossing count being based on a periodic magnetometer signal formed by a magnetometer of the mobile device over the duration of the elevator trip. The process 715 can be performed by an indoor location estimator system 200, e.g., and can be used to perform steps 720 and 730 of the technique 700.

At 720, it is determined whether the mobile device is inside the elevator. For instance, it can be determined that a current coordinate of the mobile device is $(x_E, y_E, L_i)$, where $(x_E, y_E)$ is the elevator location on each of N levels of a multilevel building, and $L_i$ is a departure level.

At 822, it is verified whether the mobile device is in a walking state (denoted 101 in FIG. 1), based on characteristics of an accelerometer signal a(t) formed by an accelerometer of the mobile device. If it is found that the accelerometer signal a(t) is indicative of the walking state 101, e.g., as shown in FIG. 5A, for t≤t1, then the mobile device has just arrived inside the elevator. Else, if it is found that the accelerometer signal a(t) is quiescent, then the mobile device is stationary inside the elevator.

At 825, it is verified whether or not the elevator cabin, inside which the mobile device is stationary, is crossing levels of the multilevel building, based on a magnetometer signal m(t) formed by a magnetometer of the mobile device. The verification includes monitoring whether the magnetometer signal m(t) is periodic (as shown in FIG. 6A for t1<t<t2) or quiescent (as shown in FIG. 6A for t≤$t_1$ and t≥$t_2$). If it is found that the magnetometer signal m(t) is periodic, then the elevator cabin is level-crossing, i.e., it ascends or descends through the elevator shaft. This corresponds to state 102 of the mobile device: "stationary at ($x_E$,$y_E$) elevator location while level-crossing." At optional step 730a, a level-crossing count can be incremented in real time, upon formation of each level-crossing signature (like the one shown in FIG. 6A) in the magnetometer signal m(t). Alternatively, all level-crossing signatures in the magnetometer signal m(t) can be counted at the end of the elevator trip, at 730b, along the branch 825N. Note that the process 715 can be implemented such that, if step 730a is required, then step 730b is skipped as being redundant, and vice versa, if step 730b is required, then step 730a is skipped as being redundant.

At 735a, it is verified whether x-y indoor navigation (INAV) is ON. Here, x-y INAV is said to be ON if the indoor location estimator system 200 is allowed to estimate the in-plane location of the mobile device along planes parallel to the (x,y) plane. However, because, in its current state 102, the mobile device is confined inside the elevator cabin at an in-plane location ($x_E$, $y_E$), it is not needed to estimate the in-plane location of the mobile device until the end of the elevator trip. Therefore, at 836, x-y INAV is turned OFF.

The branch 825Y can be iterated for as long as new level-crossing signatures will be formed in the magnetometer signal m(t). When, at 825, it is found that the magnetometer signal m(t) is quiescent (as shown in FIG. 6A for t≥t2), then the elevator cabin has arrived at an (yet to be determined) arrival level $L_j$, e.g., at t=$t_2$. At 735b, it is verified whether x-y INAV is ON. As the branch 825N has been entered after having traversed the branch 825Y, it is found that x-y INAV is not ON. At 730b, if step 730a has been skipped, then a total level-crossing count is determined from the entire trace of the magnetometer signal m(t), for $t_1$<t<$t_2$, as described above in connection with FIG. 6A. Else, if step 730a has been performed, then step 730b is skipped and a total level-crossing count is equal to a number of iterations through the 825Y branch. Note that the arrival level $L_j$ is determined by combining the departure level $L_i$ with the total level-crossing count determined at one of 730a or 730b, as described above in connection with FIG. 6A.

At 838, x-y INAV is turned ON as the mobile device will soon exit from the elevator cabin and it will be required for the indoor location estimator system 200 to estimate the in-plane location of the mobile device on the arrival level L Back at 822, it is found that the accelerometer signal a(t) is indicative of the walking state 101, e.g., as shown in FIG. 5A, for t≥t2, which indicates that the mobile device is ready to depart from the ($x_E$, $y_E$, $L_j$) location of the elevator. Back at 720, it is determined that the mobile device is being walked away from the ($x_E$, $y_E$, $L_j$) location of the elevator to other locations (x, y, $L_j$) on the arrival level $L_j$.

Figure 9:
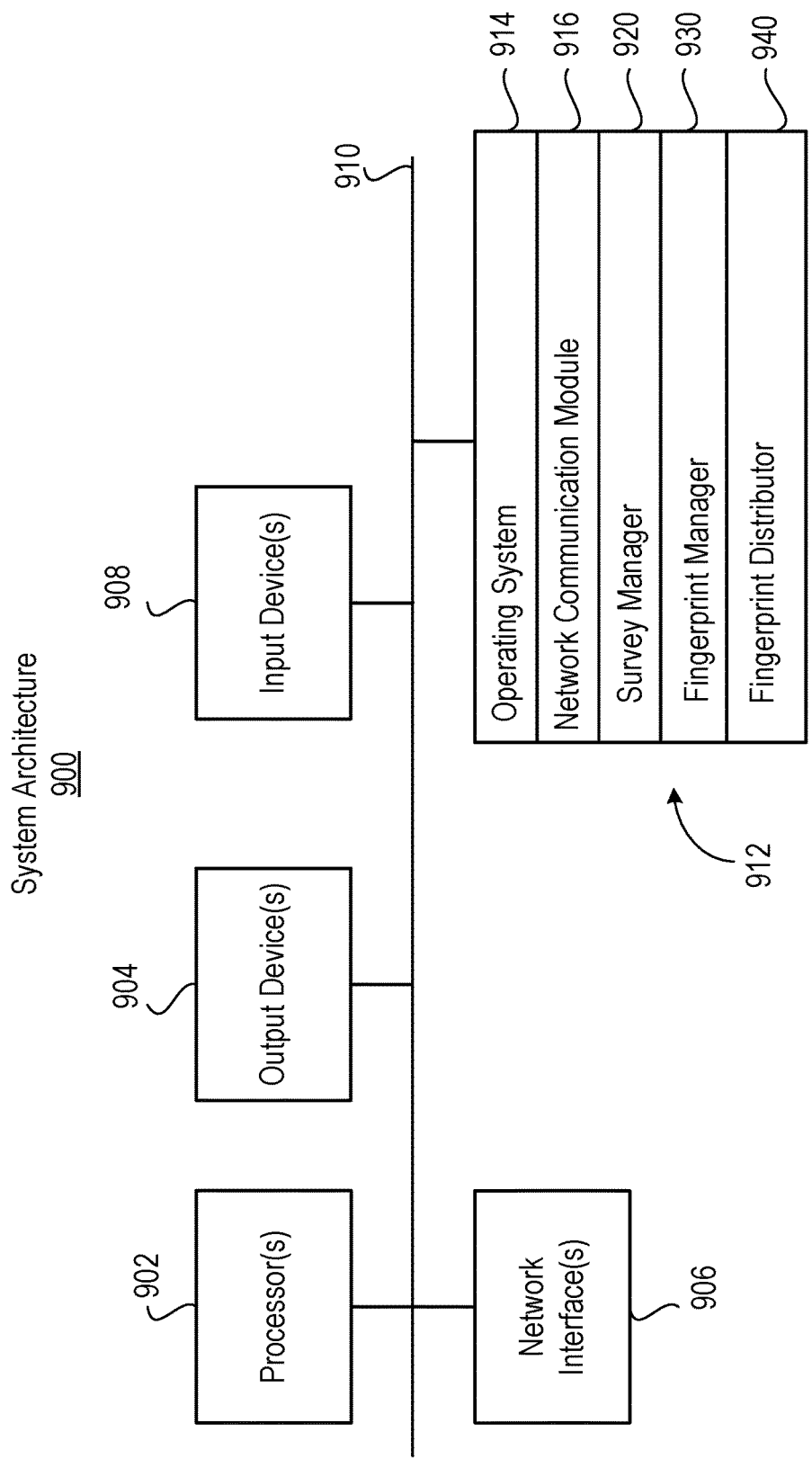
FIG. 9 shows an example of a system architecture for implementing the features and operations of FIGS. 1-8.

FIG. 9 is a block diagram of an exemplary system architecture for implementing the features and operations of FIGS. 1-8. Other architectures are possible, including architectures with more or fewer components. In some implementations, architecture 900 includes one or more processors 902 (e.g., dual-core Intel® Xeon® Processors), one or more output devices 904 (e.g., LCD), one or more network interfaces 906, one or more input devices 908 (e.g., mouse, keyboard, touch-sensitive display) and one or more computer-readable mediums 912 (e.g., RAM, ROM, SDRAM, hard disk, optical disk, flash memory, etc.). These components can exchange communications and data over one or more communication channels 910 (e.g., buses), which can utilize various hardware and software for facilitating the transfer of data and control signals between components.

The term "computer-readable medium" refers to a medium that participates in providing instructions to processor 902 for execution, including without limitation, non-volatile media (e.g., optical or magnetic disks), volatile media (e.g., memory) and transmission media. Transmission media includes, without limitation, coaxial cables, copper wire and fiber optics.

Computer-readable medium 912 can further include operating system 914 (e.g., a Linux® operating system), and network communication module 916. In addition, the computer-readable medium 912 can include survey manager 920, fingerprint manager 930, and fingerprint distributor 940 for managing location fingerprint data. Operating system 914 can be multi-user, multiprocessing, multitasking, multithreading, real time, etc. Operating system 914 performs basic tasks, including but not limited to: recognizing input from and providing output to devices 906, 908; keeping track and managing files and directories on computer-readable mediums 912 (e.g., memory or a storage device); controlling peripheral devices; and managing traffic on the one or more communication channels 910. Network communications module 916 includes various components for establishing and maintaining network connections (e.g., software for implementing communication protocols, such as TCP/IP, HTTP, etc.).

Survey manager 920 can include computer instructions that, when executed, cause processor 902 to provide survey instructions and maps to a sampling device and receive survey data from the sampling device. Fingerprint manager 930 can include computer instructions that, when executed, cause processor 902 to perform operations of signal estimator and fingerprint engine. Fingerprint distributor 940 can include computer instructions that, when executed, cause processor 902 to respond to a fingerprint request from a mobile device (e.g., mobile device 100 of FIG. 4), including sending location fingerprint data to the requesting mobile device.

Architecture 900 can be implemented in a parallel processing or peer-to-peer infrastructure or on a single device with one or more processors. Software can include multiple software components or can be a single body of code.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, a browser-based web application, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor or a retina display device for displaying information to the user. The computer can have a touch surface input device (e.g., a touch screen) or a keyboard and a pointing device such as a mouse or a trackball by which the user can provide input to the computer. The computer can have a voice input device for receiving voice commands from the user.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Figure 10:
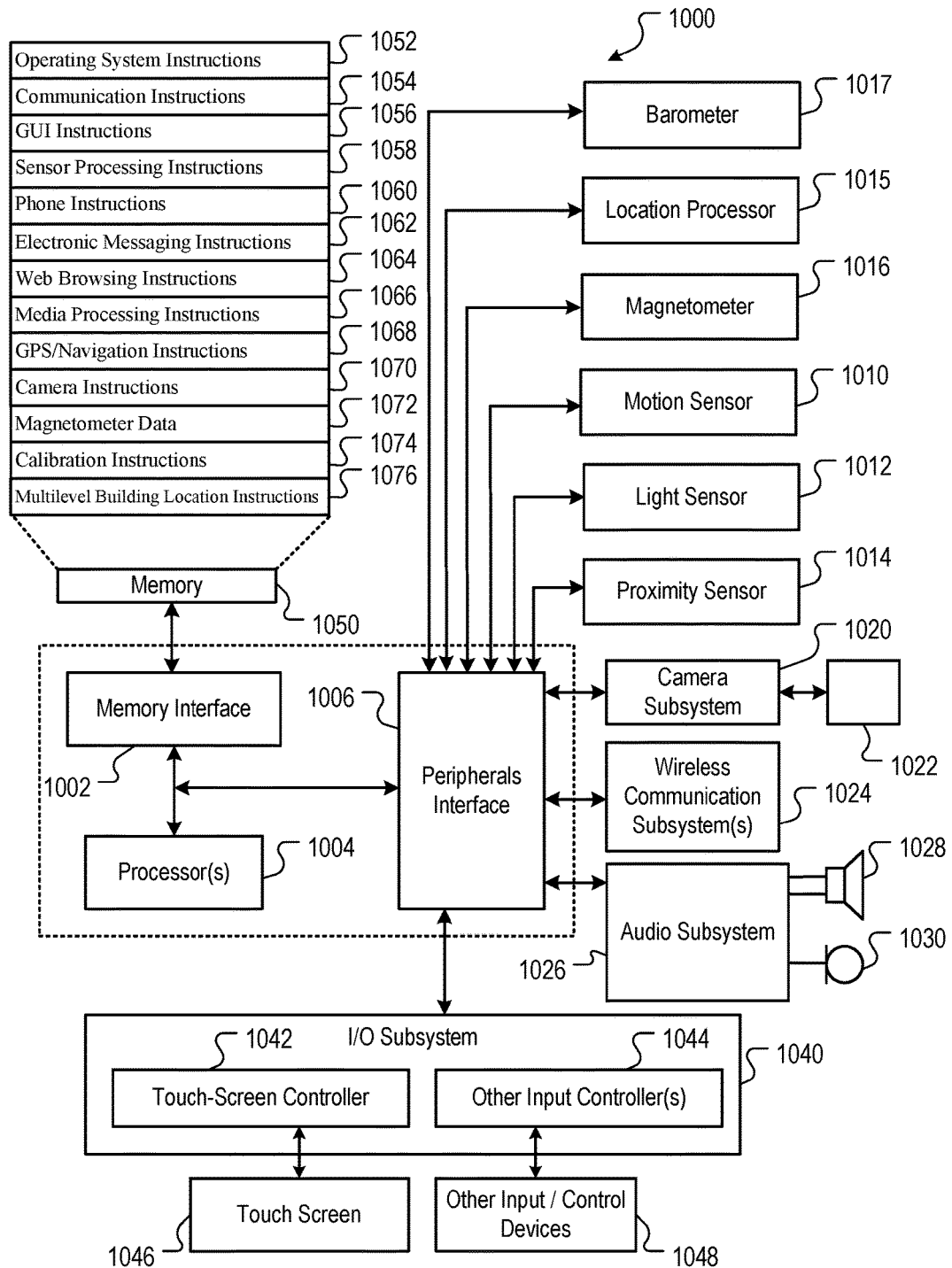
FIG. 10 shows an example of a device architecture of a mobile device implementing the features and operations described in reference to FIGS. 1-8.

FIG. 10 shows an example of a device architecture of a mobile device 1000 implementing the features and operations described in reference to FIGS. 1-8. A mobile device (e.g., mobile device 100) can include memory interface 1002, one or more data processors, image processors and/or processors 1004, and peripherals interface 1006. Memory interface 1002, one or more processors 1004 and/or peripherals interface 1006 can be separate components or can be integrated in one or more integrated circuits. Processors 1004 can include application processors, baseband processors, and wireless processors. The various components in mobile device 106, for example, can be coupled by one or more communication buses or signal lines.

Sensors, devices, and subsystems can be coupled to peripherals interface 1006 to facilitate multiple functionalities. For example, motion sensor 1010, light sensor 1012, and proximity sensor 1014 can be coupled to peripherals interface 1006 to facilitate orientation, lighting, and proximity functions of the mobile device. Location processor 1015 (e.g., GPS receiver) can be connected to peripherals interface 1006 to provide geopositioning. Electronic magnetometer 1016 (e.g., an integrated circuit chip) can also be connected to peripherals interface 1006 to provide data that can be used to determine the direction of magnetic North. Thus, electronic magnetometer 1016 can be used as an electronic compass. Motion sensor 1010 can include one or more accelerometers configured to determine change of speed and direction of movement of the mobile device. Barometer 1017 can include one or more devices connected to peripherals interface 1006 and configured to measure pressure of atmosphere around the mobile device.

Camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which a mobile device is intended to operate. For example, a mobile device can include communication subsystems 1024 designed to operate over a GSM network, a GPRS network, an EDGE network, a Wi-Fi™ or WiMax™ network, and a Bluetooth™ network. In particular, the wireless communication subsystems 1024 can include hosting protocols such that the mobile device can be configured as a base station for other wireless devices.

Audio subsystem 1026 can be coupled to a speaker 1028 and a microphone 1030 to facilitate voice-enabled functions, such as voice recognition, voice replication, digital recording, and telephony functions. Audio subsystem 1026 can be configured to receive voice commands from the user.

I/O subsystem 1040 can include touch screen controller 1042 and/or other input controller(s) 1044. Touch-screen controller 1042 can be coupled to a touch screen 1046 or pad. Touch screen 1046 and touch screen controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 1046.

Other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of speaker 1028 and/or microphone 1030.

In one implementation, a pressing of the button for a first duration may disengage a lock of the touch screen 1046; and a pressing of the button for a second duration that is longer than the first duration may turn power to mobile device 106 on or off. The user may be able to customize a functionality of one or more of the buttons. The touch screen 1046 can, for example, also be used to implement virtual or soft buttons and/or a keyboard.

In some implementations, mobile device 106 can present recorded audio and/or video files, such as MP3, AAC, and MPEG files. In some implementations, mobile device 106 can include the functionality of an MP3 player. Mobile device 106 may, therefore, include a pin connector that is compatible with the iPod. Other input/output and control devices can also be used.

Memory interface 1002 can be coupled to memory 1050. Memory 1050 can include high-speed random access memory and/or non-volatile memory, such as one or more magnetic disk storage devices, one or more optical storage devices, and/or flash memory (e.g., NAND, NOR). Memory 1050 can store operating system 1052, such as Darwin, RTXC, LINUX, UNIX, OS X, WINDOWS, or an embedded operating system such as VxWorks. Operating system 1052 may include instructions for handling basic system services and for performing hardware dependent tasks. In some implementations, operating system 1052 can include a kernel (e.g., UNIX kernel).

Memory 1050 may also store communication instructions 1054 to facilitate communicating with one or more additional devices, one or more computers and/or one or more servers. Memory 1050 may include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes and instructions; camera instructions 1070 to facilitate camera-related processes and functions; magnetometer data 1072 and calibration instructions 1074 to facilitate magnetometer calibration. The memory 1050 may also store other software instructions (not shown), such as security instructions, web video instructions to facilitate web video-related processes and functions, and/or web shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1050. Memory 1050 can include venue location instructions 1076 that can be used to request location fingerprint data and determine a location of the mobile device when the mobile device is at a venue, e.g., inside of a multilevel building where GPS signals are unavailable.

Each of the above identified instructions and applications can correspond to a set of instructions for performing one or more functions described above. These instructions need not be implemented as separate software programs, procedures, or modules. Memory 1050 can include additional instructions or fewer instructions. Furthermore, various functions of the mobile device may be implemented in hardware and/or in software, including in one or more signal processing and/or application specific integrated circuits.

Figure 11:
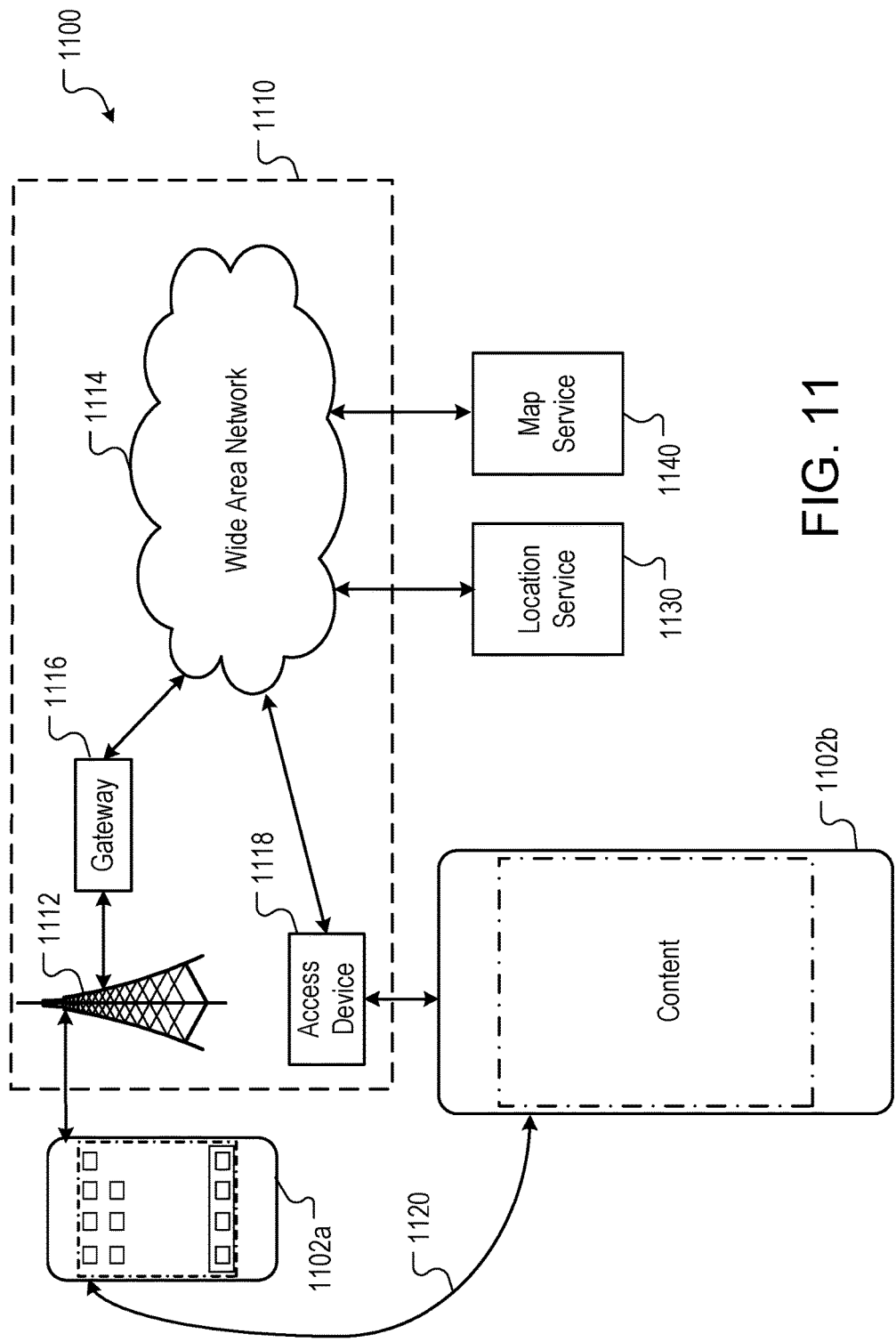
FIG. 11 shows an example of a network operating environment for the mobile devices of FIGS. 1-8.

FIG. 11 shows an example of a network operating environment 1100 for the mobile devices of FIGS. 1-8. Mobile devices 1102a and 1102b (like the mobile device 100) can, for example, communicate over one or more wired and/or wireless networks 1110 in data communication. For example, a wireless network 1112, e.g., a cellular network, can communicate with a wide area network (WAN) 1114, such as the Internet, by use of a gateway 1116. Likewise, an access device 1118, such as an 802.11g wireless access point, can provide communication access to the wide area network 1114.

In some implementations, both voice and data communications can be established over wireless network 1112 and the access device 1118. For example, mobile device 1102a can place and receive phone calls (e.g., using voice over Internet Protocol (VoIP) protocols), send and receive e-mail messages (e.g., using Post Office Protocol 3 (POP3)), and retrieve electronic documents and/or streams, such as web pages, photographs, and videos, over wireless network 1112, gateway 1116, and wide area network 1114 (e.g., using Transmission Control Protocol/Internet Protocol (TCP/IP) or User Datagram Protocol (UDP)). Likewise, in some implementations, the mobile device 1102b can place and receive phone calls, send and receive e-mail messages, and retrieve electronic documents over the access device 1118 and the wide area network 1114. In some implementations, mobile device 1102a or 1102b can be physically connected to the access device 1118 using one or more cables and the access device 1118 can be a personal computer. In this configuration, mobile device 1102a or 1102b can be referred to as a "tethered" device.

Mobile devices 1102a and 1102b can also establish communications by other means. For example, wireless device 1102a can communicate with other wireless devices, e.g., other mobile devices, cell phones, etc., over the wireless network 1112. Likewise, mobile devices 1102a and 1102b can establish peer-to-peer communications 1120, e.g., a personal area network, by use of one or more communication subsystems, such as the Bluetooth™ communication devices. Other communication protocols and topologies can also be implemented.

The mobile device 1102a or 1102b can, for example, communicate with one or more services 1130 and 1140 over the one or more wired and/or wireless networks. For example, one or more location services 1130 can conduct surveys of venues, generate location fingerprint data for each venue (e.g., for a multilevel building), and provide the location fingerprint data to mobile device 1102a or 1102b. Map service 1140 can, for example, provide maps of venues, e.g., floor plans of a multilevel building to mobile device 1102a or 1102b.

Mobile device 1102a or 1102b can also access other data and content over the one or more wired and/or wireless networks. For example, content publishers, such as news sites, Really Simple Syndication (RSS) feeds, web sites, blogs, social networking sites, developer networks, etc., can be accessed by mobile device 1102a or 1102b. Such access can be provided by invocation of a web browsing function or application (e.g., a browser) in response to a user touching, for example, a Web object.

Other embodiments fall within the scope of the following claims.

What is claimed is:

1. A mobile device comprising:
   a magnetometer;
   a storage device to store floor plans of respective levels of a multilevel building; and
   one or more hardware processors implementing an indoor location estimator system configured to:
      estimate location of the mobile device while the mobile device is in motion on a first level of the multilevel building, the mobile device location on the first level being estimated based on the first level's floor plan;
      estimate that the mobile device enters an elevator of the multilevel building, on the first level, and exits the elevator after a time interval;
      determine, at least in part based on characteristics of a periodic magnetometer signal, that the mobile device has exited the elevator on a second level of the multilevel building that is offset from the first level by a number of levels, wherein the periodic magnetometer signal is formed, by the magnetometer, in response to the magnetometer traversing a portion of an iron-based periodic structure corresponding to the number of levels of the multilevel building during the time interval;
      in response to determination of the second level, select the second level's floor plan from among the stored floor plans; and
      estimate location of the mobile device while the mobile device is in motion on the second level of the multilevel building based on the selected floor plan.

2. The mobile device of claim 1, wherein the indoor location estimator system counts periods of the periodic magnetometer signal formed during the time interval, and attributes the counted periods to the number of levels between the first level where the mobile device has entered the elevator and the second level where the mobile device has exited the elevator.

3. The mobile device of claim 2, further comprising
   a barometer,
   wherein the second level where the mobile device has exited the elevator is determined by the indoor location estimator system as the first level
      plus the number of levels, if a barometer signal indicates an increase in altitude over the time interval, or
      minus the number of levels, if a barometer signal indicates a decrease in altitude over the time interval.

4. The mobile device of claim 1, comprising
   a barometer,
   wherein to determine the second level where the mobile device has exited the elevator, the indoor location estimator system
      estimates two or more potential levels based on (i) a barometer signal indicative of an altitude difference between the first level and the potential levels, and (ii) a known distance between adjacent levels, and
      uses the characteristics of the periodic magnetometer signal to select the second level where the mobile device has exited the elevator from among the two or more potential levels.

5. The mobile device of claim 1, further comprising
   an accelerometer,
   wherein the estimation by the indoor location estimator system whether the mobile device is inside the elevator during the time interval is performed in response to receipt, by the indoor location estimator system, of
      portions of an accelerometer signal indicative of a walking state, prior to and after the time interval, and
      another portion of the accelerator signal indicative of a stationary state, during the time interval.

6. The mobile device of claim 1, wherein the indoor location estimator system estimates the location of the mobile device while the mobile device is in motion on either of the first level or the second level of the multilevel building as an output of a probabilistic particle filter.

7. The mobile device of claim 6, wherein the indoor location estimator system
   interrupts estimation of location of the mobile device along directions orthogonal to a direction of an elevator trip for a duration of the periodic magnetometer signal, and
   resumes the estimation of the location along directions orthogonal to the direction of the elevator trip when the periodic magnetometer signal subsides.

8. A method for estimating location of a mobile device in a multilevel building, the method comprising:
   estimating, by the mobile device, a location of the mobile device while the mobile device is in motion on a departure level of the multilevel building, the mobile device location on the departure level being estimated using the departure level's floor plan from among a plurality of floor plans of respective levels of the multilevel building;
   estimating, by the mobile device, that the mobile device enters an elevator of the multilevel building, on the departure level, and then exits the elevator after a time interval;
   determining, by the mobile device at least in part based on characteristics of a periodic magnetometer signal, that the mobile device has exited the elevator on an arrival level of the multilevel building that is offset from the departure level by a number of levels, wherein the periodic magnetometer signal is formed, by a magnetometer of the mobile device, in response to the magnetometer traversing a portion of an iron-based periodic structure corresponding to the number of levels of the multilevel building during the time interval;

in response to determination of the arrival level, selecting the arrival level's floor plan from among the plurality of floor plans; and estimating location of the mobile device while the mobile device is in motion on the arrival level of the multilevel building based on the selected floor plan.

9. The method of claim 8, further comprising:

counting, by the mobile device, periods of the periodic magnetometer signal formed during the time interval; and attributing, by the mobile device, the counted periods to the number of levels between the departure level where the mobile device has entered the elevator and the arrival level where the mobile device has exited the elevator.

10. The method of claim 9, further comprising:

adding, by the mobile device, the number of levels to the departure level to obtain the arrival level, if a barometer signal indicates an increase in altitude over the time interval, wherein the barometer signal is formed by a barometer of the mobile device; and subtracting, by the mobile device, the number of levels from the departure level to obtain the arrival level, if the barometer signal indicates a decrease in altitude over the time interval.

11. The method of claim 8, further comprising:

estimating, by the mobile device, two or more potential levels based on (i) a barometer signal indicative of an altitude difference between the departure level and the potential levels, and (ii) a known distance between adjacent levels, wherein the barometer signal is formed by a barometer of the mobile device; and selecting, by the mobile device, the arrival level where the mobile device has exited the elevator from among the two or more potential levels based on the characteristics of the periodic magnetometer signal.

12. The method of claim 8, wherein the estimating that the mobile device is inside the elevator during the time interval comprises receiving, prior to and after the time interval, portions of an accelerometer signal indicative of a walking state, the accelerator signal being formed by an accelerometer of the mobile device, and during the time interval, another portion of the accelerator signal indicative of a stationary state.

13. The method of claim 8, further comprising estimating, by the mobile device, the location of the mobile device while the mobile device is in motion on either of the departure level or the arrival level of the multilevel building by operating a probabilistic particle filter.

14. The method of claim 13, further comprising interrupting, by the mobile device, estimation of the location of the mobile device along directions orthogonal to a direction of an elevator trip for a duration of the periodic magnetometer signal; and resuming, by the mobile device, the estimation of the location along directions orthogonal to the direction of the elevator trip when the periodic magnetometer signal subsides.

15. A non-transitory computer-readable medium encoding instructions that, when executed by processor of a mobile device, causes the mobile device to perform operations comprising:

estimating that the mobile device enters an elevator of a multilevel building, on a departure level, and then exits the elevator after a time interval; and determining, at least in part based on characteristics of a periodic magnetometer signal, that the mobile device has exited the elevator on an arrival level of the multilevel building that is offset from the departure level by a number of levels, wherein the periodic magnetometer signal is formed, by a magnetometer of the mobile device, in response to the magnetometer traversing a portion of an iron-based periodic structure corresponding to the number of levels of the multilevel building during the time interval.

16. The non-transitory computer-readable medium of claim 15, wherein the operations further comprise:

counting periods of the periodic magnetometer signal formed during the time interval; and attributing the counted periods to the number of levels between the departure level where the mobile device has entered the elevator and the arrival level where the mobile device has exited the elevator.

17. The non-transitory computer-readable medium of claim 16, wherein the operations further comprise:

adding the number of levels to the departure level to obtain the arrival level, if a barometer signal indicates an increase in altitude over the time interval, wherein the barometer signal is formed by a barometer of the mobile device; and subtracting the number of levels from the departure level to obtain the arrival level, if the barometer signal indicates a decrease in altitude over the time interval.

18. The non-transitory computer-readable medium of claim 15, wherein the operations further comprise:

estimating two or more potential levels based on (i) a barometer signal indicative of an altitude difference between the departure level and the potential levels, and (ii) a known distance between adjacent levels, wherein the barometer signal is formed by a barometer of the mobile device; and selecting the arrival level where the mobile device has exited the elevator from among the two or more potential levels based on the characteristics of the periodic magnetometer signal.

19. The non-transitory computer-readable medium of claim 15, wherein the operation of estimating that the mobile device is inside the elevator during the time interval comprises receiving, prior to and after the time interval, portions of an accelerometer signal indicative of a walking state, the accelerator signal being formed by an accelerometer of the mobile device, and during the time interval, another portion of the accelerator signal indicative of a stationary state.

20. The non-transitory computer-readable medium of claim 15, wherein the operations further comprise:

estimating, by executing a probabilistic particle filter, a location of the mobile device while the mobile device is in motion on either of the departure level of the multilevel building, prior to entering the elevator, or the arrival level of the multilevel building, after exiting the elevator;

interrupting the operation of estimating the location of the mobile device along directions orthogonal to a direction of an elevator trip for a duration of the periodic magnetometer signal; and resuming the operation of estimating the location along directions orthogonal to the direction of the elevator trip when the periodic magnetometer signal subsides.

\* \* \* \* \*